United States Patent
Mason (10) Patent No.: US 10,639,751 B2
(45) Date of Patent: May 5, 2020

(54) MANUFACTURING ASSEMBLY AND METHOD FOR MANUFACTURING A FAN BLADE

(71) Applicant: ROLLS-ROYCE plc, London (GB)

(72) Inventor: John H. Mason, Barnoldswick (GB)

(73) Assignee: ROLLS-ROYCE plc, London (GB)

( * ) Notice: Subject to any disclaimer, the term of this patent is extended or adjusted under 35 U.S.C. 154(b) by 65 days.

(21) Appl. No.: 16/016,735

(22) Filed: Jun. 25, 2018

(65) Prior Publication Data

US 2019/0001449 A1 Jan. 3, 2019

(30) Foreign Application Priority Data

Jul. 3, 2017 (GB) .................................. 1710651.9

(51) Int. Cl.
*B23P 15/04* (2006.01)
*F01D 5/18* (2006.01)
(Continued)

(52) U.S. Cl.
CPC ............ *B23P 15/04* (2013.01); *B21D 26/059* (2013.01); *B21D 53/78* (2013.01); *F01D 5/18* (2013.01); *F04D 29/388* (2013.01); *B21D 26/055* (2013.01); *B23K 20/02* (2013.01); *B23K 2101/001* (2018.08); *F02K 3/06* (2013.01); *F05D 2220/32* (2013.01); *F05D 2230/236* (2013.01); *F05D 2230/25* (2013.01); *F05D 2230/50* (2013.01); *F05D 2240/30* (2013.01); *F05D 2300/174* (2013.01)

(58) Field of Classification Search
CPC .......... B23P 15/04; B64C 11/24; F01D 5/147; F01D 5/18; Y10T 29/49337; Y10T 29/49339; B21D 53/78; B21D 26/021; B21D 26/055; B21D 26/059; B23K 20/02; B23K 2101/001
See application file for complete search history.

(56) References Cited

U.S. PATENT DOCUMENTS

| 5,226,578 A | * | 7/1993 | Douglas | ............... B21D 26/055 228/118 |
| 5,284,288 A | * | 2/1994 | Woodward | ................ F28F 3/14 228/157 |

(Continued)

FOREIGN PATENT DOCUMENTS

| EP | 0549172 | 12/1992 |
| EP | 2862643 | 4/2015 |

OTHER PUBLICATIONS

Great Britain Search Report dated Nov. 23, 2017 issued in GB Patent Application No. 1710651.9.

*Primary Examiner* — Matthew P Travers
(74) *Attorney, Agent, or Firm* — Oliff PLC (57) ABSTRACT

The present disclosure relates to an assembly for formation of a fan blade. The assembly comprises a suction panel; a pressure panel; and a membrane having a leading edge and a trailing edge. The membrane is sandwiched between the suction panel and pressure panel. The membrane comprises a gas entry slot extending in a radial direction, the gas entry slot having a radially outer receiving portion for receiving a pipe, and a radially inner portion. The radially inner portion of the gas entry slot has a substantially uniform width in a direction between the leading and trailing edge of the membrane.

13 Claims, 5 Drawing Sheets

(51) Int. Cl.
    *B21D 26/059* (2011.01)
    *B21D 53/78* (2006.01)
    *F04D 29/38* (2006.01)
    B21D 26/055 (2011.01)
    B23K 101/00 (2006.01)
    B23K 20/02 (2006.01)
    F02K 3/06 (2006.01)

(56) References Cited

U.S. PATENT DOCUMENTS

| | | | | |
|---|---|---|---|---|
| 5,323,536 A * | 6/1994 | Fowler | ............ | B21D 26/055 228/157 |
| 5,363,555 A * | 11/1994 | Fowler | ............ | B21D 26/055 29/889.72 |
| 5,479,705 A * | 1/1996 | Fowler | ............ | B21D 26/055 29/889.72 |
| 5,611,944 A * | 3/1997 | Gilkinson | ............ | B21D 26/055 219/117.1 |
| 6,264,091 B1 * | 7/2001 | Milburn | ............ | B23K 20/021 228/118 |
| 6,418,619 B1 * | 7/2002 | Launders | ............ | B21D 53/78 29/889.1 |
| 6,467,168 B2 * | 10/2002 | Wallis | ............ | B21D 26/055 29/889.721 |
| 6,739,049 B2 * | 5/2004 | Nicholson | ............ | B21D 26/055 29/889.7 |
| 6,871,398 B2 * | 3/2005 | Richardson | ............ | B21D 26/055 29/889.72 |
| 7,025,568 B2 * | 4/2006 | Jones | ............ | F01D 5/16 29/889.72 |
| 7,237,709 B2 * | 7/2007 | Beckford | ............ | B21D 26/055 228/157 |
| 8,162,202 B2 * | 4/2012 | Milburn | ............ | B21D 26/021 228/234.1 |
| 8,382,441 B2 * | 2/2013 | Brennand | ............ | B21D 26/059 416/229 R |
| 8,408,447 B2 * | 4/2013 | Couturier | ............ | B23K 20/021 228/193 |
| 8,555,501 B2 * | 10/2013 | Brennand | ............ | B21D 26/055 29/889.72 |
| 8,764,404 B2 | 7/2014 | Barlow et al. | | |
| 2011/0002788 A1 * | 1/2011 | Mason | ............ | B21D 26/055 416/223 R |

* cited by examiner

MANUFACTURING ASSEMBLY AND METHOD FOR MANUFACTURING A FAN BLADE

CROSS-REFERENCE TO RELATED APPLICATIONS

This application is based upon and claims the benefit of priority from British Patent Application Number 1710651.9 filed 3 Jul. 2017, the entire contents of which are incorporated by reference.

BACKGROUND

Technical Field

The present disclosure concerns a membrane, an assembly and a method for manufacturing a fan blade such as a hollow, wide-chord fan blade for a gas turbine engine.

Description of the Related Art

Figure 1:
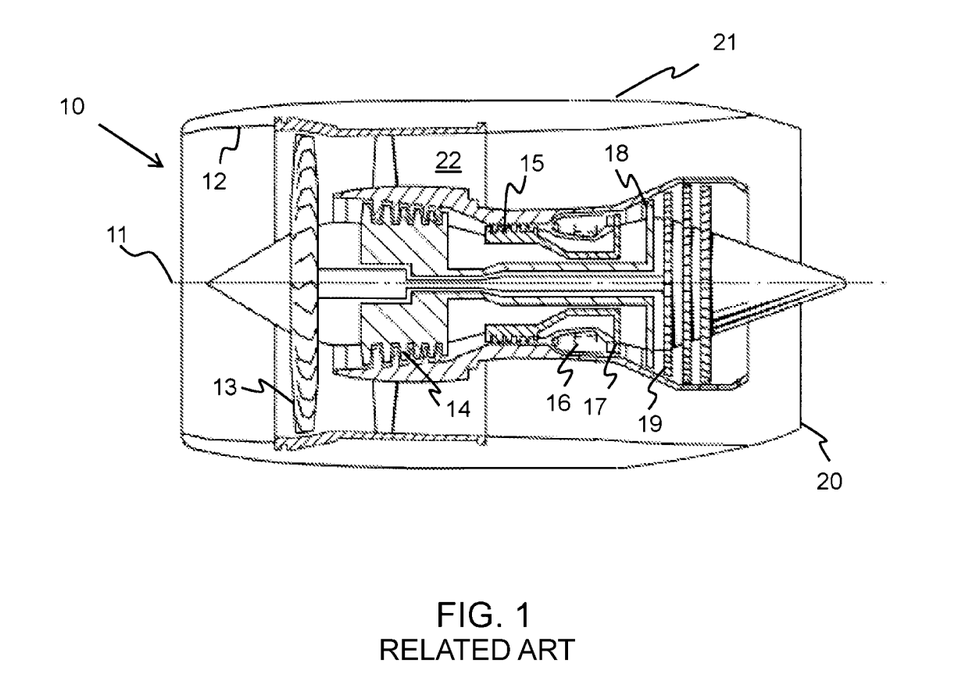
FIG. 1 shows an axial cross-section through a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The propulsive fan 13 comprises a series of hollow, wide-chord fan blades, each having an aerofoil section and a root section, the root sections securing the fan blades to a fan disc.

Figure 2:
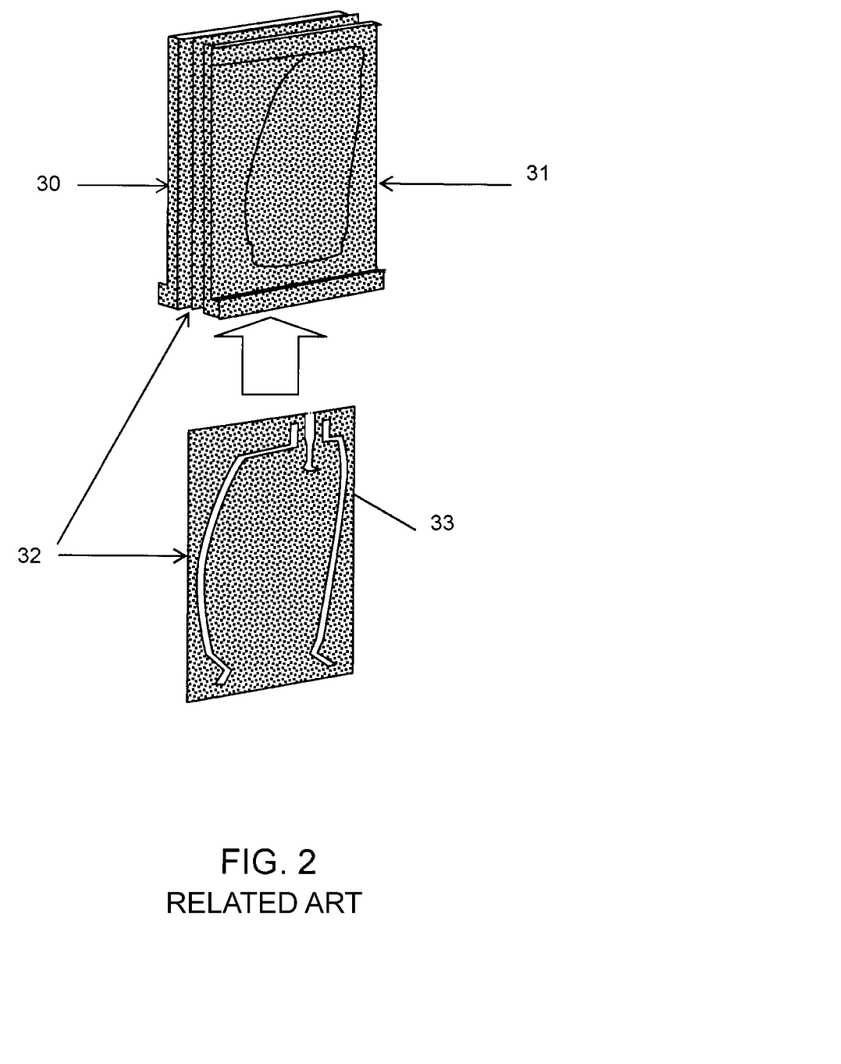
FIG. 2 shows a known assembly for manufacture of a fan blade.

The fan blades are typically formed using a diffusion bonding and super-plastic forming process. Three titanium layers comprising a pressure panel 30, a suction panel 31 and an interposed membrane 32 are aligned in a sandwich assembly as shown in FIG. 2 and then diffusion bonded around their periphery.

The membrane includes a gas entry slot 33 which is provided to allow gas to be forced between the pressure panel 30 and the suction panel 31 during the super-plastic forming process in order to form the cavity within the fan blade. The gas entry slot is subsequently sealed in the finished fan blade by welding to form a vacuum within the hollow fan blade.

Figure 3:
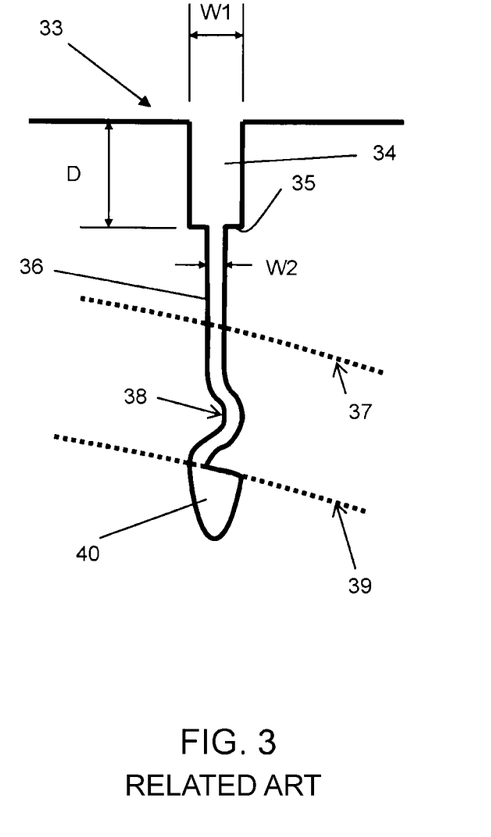
FIG. 3 shows the geometry of the gas entry slot in the known assembly.

As shown in FIG. 3, the gas entry slot 33 formed within the membrane 32 has a wider entry portion 34 (typically with a width W1 around 6.4 mm wide) extending radially within the sandwich assembly to a depth D of greater than 2 mm and typically around 40 mm. This portion is used to receive the pipe for evacuating the sealed sandwich assembly prior to diffusion bonding and subsequently the pipe for introducing gas during the super-plastic forming.

There is then a stepped transition 35 to a narrower portion 36 (typically with a width W2 around 3 mm). The narrower portion extends radially within the sandwich assembly to intersect the eventual blade tip cone 37 and then forms a meander portion 38 which is designed to prevent ingress of molten material into the cavity during subsequent sealing of the gas entry slot. The meander portion typically has an external radius of around 6.35 mm. The narrower portion 36 then resumes its radial extension to join a cupped portion 40 at the point where the edge 39 of the eventual cavity will lie.

Figure 4:
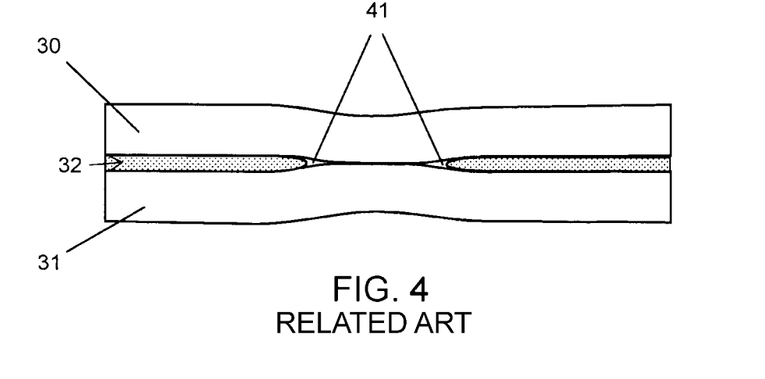
FIG. 4 shows the collapse of the gas entry slot after diffusion bonding in the known assembly.

During the diffusion bonding process, the sandwich assembly is subjected to pressure and heat resulting in joining of the pressure panel 30, suction panel 31 and membrane 32. The heat and pressure can cause the collapse of the pressure panel 30 and the suction panel 31 into the gas entry slot 33 as shown in FIG. 4. It can be seen that the collapse results in small gaps 41 that run along the edges of the gas entry slot.

During inflation of the cavity within the fan blade in the super-plastic forming process, the flow of gas through the gas entry slot 33 is limited to flow through the gaps 41. This reduces the rate at which gas can be injected into the sandwich assembly. Furthermore, turbulence induced around the stepped transition 35 in the width of the gas entry slot 33 effects the gas flow rate through the gas entry slot 33.

The control of the rate of gas introduction is important during the super-plastic forming process especially during the crack phase of the process when it is necessary to present a known volume of gas into the cavity within a fixed time period.

There is the need for a membrane, an assembly and method for manufacturing a fan blade which mitigates at least some of the problems associated with the prior art.

SUMMARY

In a first aspect, there is provided a membrane for inclusion in an assembly for formation of a fan blade, the membrane having a leading edge and a trailing edge, wherein the membrane comprises a gas entry slot extending in a radial direction, the gas entry slot having a radially outer receiving portion for receiving a pipe, and a radially inner portion wherein the radially inner portion of the gas entry slot has a substantially uniform width in a direction between the leading and trailing edge of the membrane.

The inventors have determined that the stepped increase to the cupped portion in the prior art suffers from significant collapse as the pressure panel and suction panel are less well supported in this area. Accordingly, providing a gas entry slot having a radially inner portion with a uniform width i.e. without any stepped portions, reduces turbulent flow within the gas as it travels through the gas entry slot.

Furthermore, the collapse of the gas entry slot during diffusion bonding can be reduced.

Optional features will now be set out. These are applicable singly or in any combination with any aspect.

The width of the radially inner portion of the gas entry slot in the direction between the leading and trailing edges of the membrane may be less than 7 mm, e.g., less than 5 mm, e.g. less than 3 mm, e.g. less than 1.5 mm e.g. between 1.5 and 0.2 mm, such as between 1.1 and 0.8 mm or between 1.12 and 0.785 mm.

The inventors have determined that the collapse of the gas entry slot in the membrane is greatest in the portions having the greatest width. By reducing the width to less than 1.5 mm, for example, the collapse of the gas entry slot during diffusion bonding can be further reduced.

In some embodiments, the width (W) of the radially inner portion of the gas entry slot in the direction between the leading and trailing edges is defined by the following equation:

$$W=0.785/T$$

where T is the thickness of the membrane (in a direction perpendicular to the width).

In some embodiments, the thickness of the membrane is between 0.7 and 1.0 mm.

The radially outer receiving portion may have a width (in the direction between the leading and trailing edges of the membrane) that is greater than the width of the radially inner portion e.g. it may have a width of around 6.35 mm. It may have a radial depth (in a direction perpendicular to both the width and the thickness of the membrane of between 2 and 10 mm, e.g. between 2 and 3 mm.

There is a stepped transition from the radially outer receiving portion to the radially inner portion i.e. the radially inner portion comprises the remainder of the gas entry slot other than the radially outer receiving portion.

In some embodiments, the radially inner portion proximal the radially outer receiving portion comprises a radially-oriented portion which may be substantially linear. The radially-oriented portion of the radially inner portion of the gas entry slot intersects the eventual blade tip cone. The radially-oriented (e.g. linear) portion may have a length of between 40 and 70 mm, e.g. between 40 and 60 mm.

In some embodiments, the radially inner portion of the gas entry slot comprises a hook portion at its radially innermost end where the radially inner gas entry slot maintains its uniform width but deflects through greater than 90 degrees, e.g. equal to or greater than 100 degrees, e.g. equal to or greater than 120 degrees e.g. equal to or greater than 140 degrees e.g. equal to or greater than 160 degrees such as around 163 degrees. The deflection causes the slot to extend in a substantially radially inwards direction such that the inner end of the slot is inwardly spaced from the deflection (the deflection forming the innermost point of the gas entry slot).

Accordingly, the hook portion defines a V- or U-shaped slot within the membrane. This replaces the cupped portion of the prior art and the associated step change in the width of the slot.

In some embodiments, the radially inner portion of the gas entry slot comprises a meander portion radially inwards of the hook portion i.e. interposed between the hooked portion and radially-oriented (e.g. linear) portion. The external radius of the meander portion may be around 6.35 mm.

The radial spacing between the receiving portion and the radial centre of the meander portion may be between 50 and 70 mm.

In some embodiments, the depth of the slot (in the thickness direction) equals the thickness of the membrane such that the slot is open to both faces of the membrane.

In some embodiments, the membrane is formed of titanium.

In a second aspect, there is provided an assembly for formation of a fan blade, the assembly comprising:
a suction panel;
a pressure panel; and
a membrane according to the first aspect, the membrane being sandwiched between the suction panel and pressure panel.

In some embodiments, the assembly further comprises a pipe having an internal cross-sectional area X for insertion into the receiving portion of the gas entry slot and the width (W) of the radially inner portion of the gas entry slot in the direction between the leading and trailing edges is defined by the following equation:

$$W=X/T$$

where T is the thickness of the membrane (which equates to the spacing between the pressure and suction panels).

The pipe may be bonded/welded into the assembly.

The pipe may have an external diameter of 6.35 mm.

The pipe may be received to a depth matching the depth of the receiving portion e.g. to a depth of 2 mm. In this way, the pipe opens directly into the radially inner portion of the gas slot with the cross-sectional area of the radially inner portion matching the cross-sectional area of the pipe. This reduces turbulent flow within the gas.

In some embodiments, the pressure panel and suction panel are formed of titanium.

In some embodiments, the thickness of the slot (in the direction between the pressure panel and the suction panel) equals the thickness of the membrane such that the slot is open to both faces (i.e. the face facing the suction panel and the face facing the suction panel) of the membrane.

In a third aspect, the present disclosure provides a method of forming a fan blade comprising providing an assembly according to the second aspect wherein the membrane has a thickness (T), inserting a pipe having an internal cross-sectional area (X) into the gas entry slot in the membrane, wherein the radially inner portion of the gas entry slot has a width (W) in a direction between the leading and trailing edge of the membrane such that:

$$W=X/T.$$

The inventors have determined that the collapse of the gas entry slot in the membrane is greatest in the portions having the greatest width e.g. in the cupped portion in gas entry slot in the known assemblies. By using a membrane having a gas entry slot with a radially inner portion having a cross-sectional area (W×T) which matches the cross-sectional area of the pipe, the width of the slot is reduced and thus the collapse of the gas entry slot during diffusion bonding can be reduced.

If the pipe is inserted into the receiving portion to a depth matching the depth of the receiving portion, turbulence in the gas flow can also be reduced.

In some embodiments, the method comprises bonding the periphery of the pressure panel, suction panel and membrane e.g. by diffusion bonding, prior to inserting the pipe.

In some embodiments, the method comprises welding the pipe into the assembly.

In some embodiments, the method further comprises flowing gas into the assembly through the pipe in order to inflate the assembly.

In some embodiments, the method comprises evacuating the inflated assembly.

In some embodiments, the method comprises sealing the gas entry slot, e.g. by welding. The gas entry slot may be sealed at the receiving portion.

In a fourth aspect, there is provided a fan blade manufactured according to the process of the third aspect.

In a fifth aspect, the present disclosure provides a gas turbine engine having at least one fan blade according to the fourth aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings in which.

DETAILED DESCRIPTION

Figure 5:
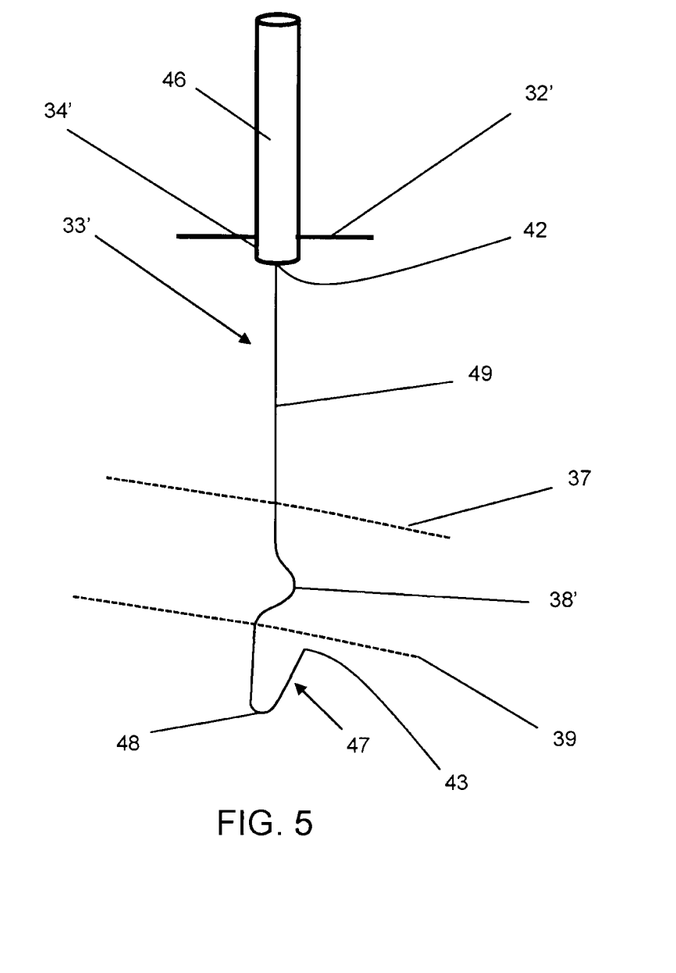
FIGS. 5 and 6 show a gas entry slot in a membrane for inclusion in an assembly for forming a fan blade.
Figure 6:
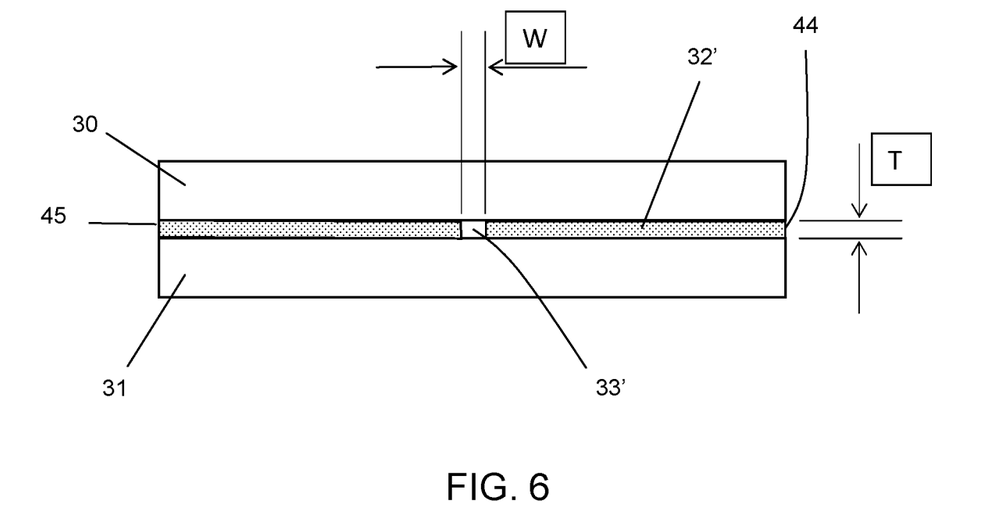

FIGS. 5 and 6 show a membrane 32' having a gas entry slot 33' which extends in a radial direction. It has a radially outer receiving portion 34' and a radially inner portion having a uniform width (W) along its entire length from its outer end 42 (where it joins the receiving portion 34') to its inner end 43. The width (W) is the dimension in a direction extending between the leading edge 45 and the trailing edge 44

The membrane has a thickness (T) of 0.76 mm. The thickness equates to the spacing between the pressure panel 30 and the suction panel 31.

The thickness of the slot (in the direction between the pressure panel 30 and the suction panel 31) equals the thickness of the membrane such that the slot is open to both faces (i.e. the face facing the suction panel and the face facing the suction panel) of the membrane.

The assembly further comprises an inflation pipe 46 (shown in FIG. 5) having an internal cross-sectional area X. For example, where the pipe has an internal diameter of 1 mm, the cross-sectional area is 0.785 mm². The external diameter of the pipe is 6.35 mm. The receiving portion 34' has a width of 6.35 mm in order to accommodate the pipe 46.

The width (W) of the radially inner portion of the gas entry slot 33' in the direction between the leading and trailing edges 45, 44 is defined by the following equation:

$$W=X/T$$

where X is the cross-sectional area of the pipe and T is the thickness of the membrane.

Accordingly, where the pipe has an internal diameter of 1 mm, the width (W) of the gas entry slot 33' in the direction between the leading and trailing edges 45, 44 is:

$$W=0.785/0.76=1.03 \text{ mm}.$$

This results in the cross-sectional area of the pipe 46 matching the cross-sectional area of the radially inner portion of the gas entry slot 33'.

The receiving portion 34' has a depth of 2 mm and the pipe 46 is inserted into the receiving portion to a depth of 2 mm such that the internal diameter of the pipe 46 opens directly into the radially inner portion of the gas entry slot 33' at its outer end 42.

The radially innermost end of the radially inner portion of the gas entry slot 33' comprises a hook portion 47 where the gas entry slot 33' maintains its uniform width but deflects through 163 degrees. The deflection 48 causes the slot 33' to extend in a substantially radially inwards direction such that the inner end 43 of the slot 33' is inwardly spaced from the deflection 48 (the deflection 48 forming the innermost point of the gas entry slot 33').

The hook portion 47 is provided radially inwards of an edge 39 where the eventual cavity within the fan blade will lie.

The gas entry slot 33' also comprises a meander portion 38' radially outwards of the hook portion 47. The meander portion 38' has an external radius of 6.35 mm.

The meander portion 38' is provided radially inwards of the eventual blade tip cone 37.

The meander portion 38' is joined to the receiving portion 34' by a linear, radially-oriented portion 49 having a length of between 40 and 60 mm. The radial spacing between the receiving portion 34' and the radial centre of the meander portion 38' is between 50 and 70 mm.

To manufacture a fan blade, the pressure panel 30, membrane 32' and suction panel 31 are assembled and an evacuation pipe (typically having an outer diameter of 6.35 mm and an inner diameter of 3 mm) is inserted (and welded) into the gas entry slot 33' to fill the receiving portion. The assembly is evacuated and then subjected to diffusion bonding to join the peripheries of the panels 30, 31 and membrane 32'.

Next, the evacuation pipe is drilled out and replaced with inflation pipe 46 (having an outer diameter of 6.35 mm and an internal diameter of 1 mm). The inflation pipe is inserted to fill the receiving section and welded into place. The assembly is subjected to super-plastic forming where gas is flowed into the assembly through the gas entry slot 33' to inflate the assembly to form a cavity. The cross-sectional area of the gas entry slot 33' matches the internal cross-sectional area (X) of the inflation pipe 46.

The inventors have determined that eliminating stepped transitions in width within the gas entry slot 33' and/or reducing the width of the gas entry slot 33' reduces the collapse of the gas entry slot 33' during diffusion bonding. In turn, this allows better control of the gas flow (and reduced turbulence) during the cracking stage of super-plastic forming such that defects and therefore rejected components can be minimised.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An assembly for formation of a fan blade, the assembly comprising:
   a suction panel;
   a pressure panel;

a membrane sandwiched between the suction panel and pressure panel, wherein:

the membrane has a leading edge and a trailing edge, and the membrane comprises a gas entry slot extending in a radial direction, the gas entry slot having a radially outer receiving portion for receiving a pipe, and a radially inner portion wherein the radially inner portion of the gas entry slot has a uniform width in a direction between the leading and trailing edge of the membrane; and a pipe, having an internal cross-sectional area X, inserted into the receiving portion, wherein the width (W) of the radially inner portion in the direction between the leading and trailing edges is defined by: W=X/T, where T is the thickness of the membrane.

2. The assembly according to claim 1 wherein the width of the radially inner portion of the gas entry slot in the direction between the leading and trailing edges of the membrane is less than 3 mm.

3. The assembly according to claim 2 wherein the width of the radially inner portion of the gas entry slot in the direction between the leading and trailing edges of the membrane is between 1.1 and 0.8 mm.

4. The assembly according to claim 1 wherein the width (W) of the radially inner portion in the direction between the leading and trailing edges is defined:

$W=0.785 \text{ mm}^2/T$ where T is the thickness of the membrane.

5. The assembly according to claim 1 wherein the radially inner portion of the gas entry slot comprises a hook portion where the radially inner portion deflects through greater than 90 degrees.

6. The assembly according to claim 5 wherein the radially inner portion deflects through 135 degrees.

7. The assembly according to claim 5 wherein the gas entry slot comprises a meander portion radially outwards of the hook portion.

8. The assembly according to claim 1 wherein the pipe is inserted into the receiving portion to a depth matching a depth of the receiving portion such that the pipe abuts the radially inner portion of the gas entry slot.

9. A method of forming a fan blade comprising providing the assembly according to claim 1 wherein the membrane has a thickness (T) and inserting the pipe having an internal cross-sectional area (X) into the gas entry slot in the membrane, wherein the radially inner portion has a width (W) in a direction between the leading and trailing edge of the membrane such that:

$W=X/T.$

10. The method according to claim 9 further comprising bonding peripheries of the pressure panel, suction panel and membrane prior to inserting the pipe.

11. The method according to claim 9 further comprising inserting the pipe into the receiving portion to a depth matching a depth of the receiving portion such that the pipe abuts the radially inner portion of the gas entry slot.

12. The method according to claim 9 comprising flowing gas into the assembly through the pipe in order to inflate the assembly.

13. The method according to claim 9 wherein the method further comprises sealing the gas entry slot.

* * * * *